United States Patent
Renner et al.

(10) Patent No.: US 9,908,646 B2
(45) Date of Patent: Mar. 6, 2018

(54) METHOD AND APPARATUS FOR PLACING PRODUCTS INTO CONTAINERS IN A ROBOT LINE

(71) Applicant: Veltru AG, Feuerthalen (CH)

(72) Inventors: Jürgen Renner, Blumberg (DE); Hans Andrea Schuler, Feuerthalen (CH)

(73) Assignee: Veltru AG, Feuerthalen (CH)

( * ) Notice: Subject to any disclaimer, the term of this patent is extended or adjusted under 35 U.S.C. 154(b) by 1200 days.

(21) Appl. No.: 13/662,672

(22) Filed: Oct. 29, 2012

(65) Prior Publication Data

US 2013/0104506 A1    May 2, 2013

(30) Foreign Application Priority Data

Oct. 31, 2011    (EP) .................................... 11187219

(51) Int. Cl.
*B65B 35/24* (2006.01)
*B65B 5/10* (2006.01)
(Continued)

(52) U.S. Cl.
CPC .............. *B65B 5/105* (2013.01); *B65B 35/24* (2013.01); *B65B 35/36* (2013.01); *B65B 35/44* (2013.01);
(Continued)

(58) Field of Classification Search
CPC .. B65B 5/10; B65B 5/12; B65B 5/105; B65B 35/16; B65B 57/02; B65B 57/10;
(Continued)

(56) References Cited

U.S. PATENT DOCUMENTS 3,751,873 A * 8/1973 Toby ...................... B65G 21/14
                                                  198/460.2
4,722,168 A * 2/1988 Heaney ................... B65B 57/14
                                                  53/450
(Continued)

FOREIGN PATENT DOCUMENTS

DE          4208818      9/1993
DE         19522368      1/1997
(Continued)

OTHER PUBLICATIONS

European Opposition issued in corresponding European Patent Application No. 11187219.8 dated Feb. 16, 2015.

*Primary Examiner* — Hemant M Desai
*Assistant Examiner* — Eduardo R Ferrero
(74) *Attorney, Agent, or Firm* — Davis & Bujold PLLC; Michael J. Bujold

(57) ABSTRACT

An apparatus (1) for inserting at least one sort of conveyed products (2) into containers (3) accommodating a specific number of products (2). The apparatus (1) has at least two placing robots (4a, 4b, 4c) defining a transfer area (15), at least one transport device (6) for transporting the products (2), and at least one transport device (7) for transporting the containers (3). The transport device (6) for the products (2) has at least one separation point (5) in the direction of travel (14) within the transfer area (15), said separation point dividing the transport device (6) for the products (2) into at least two transport portions (6a, 6b) that can be actuated independently of one another.

9 Claims, 2 Drawing Sheets

Figure 1:
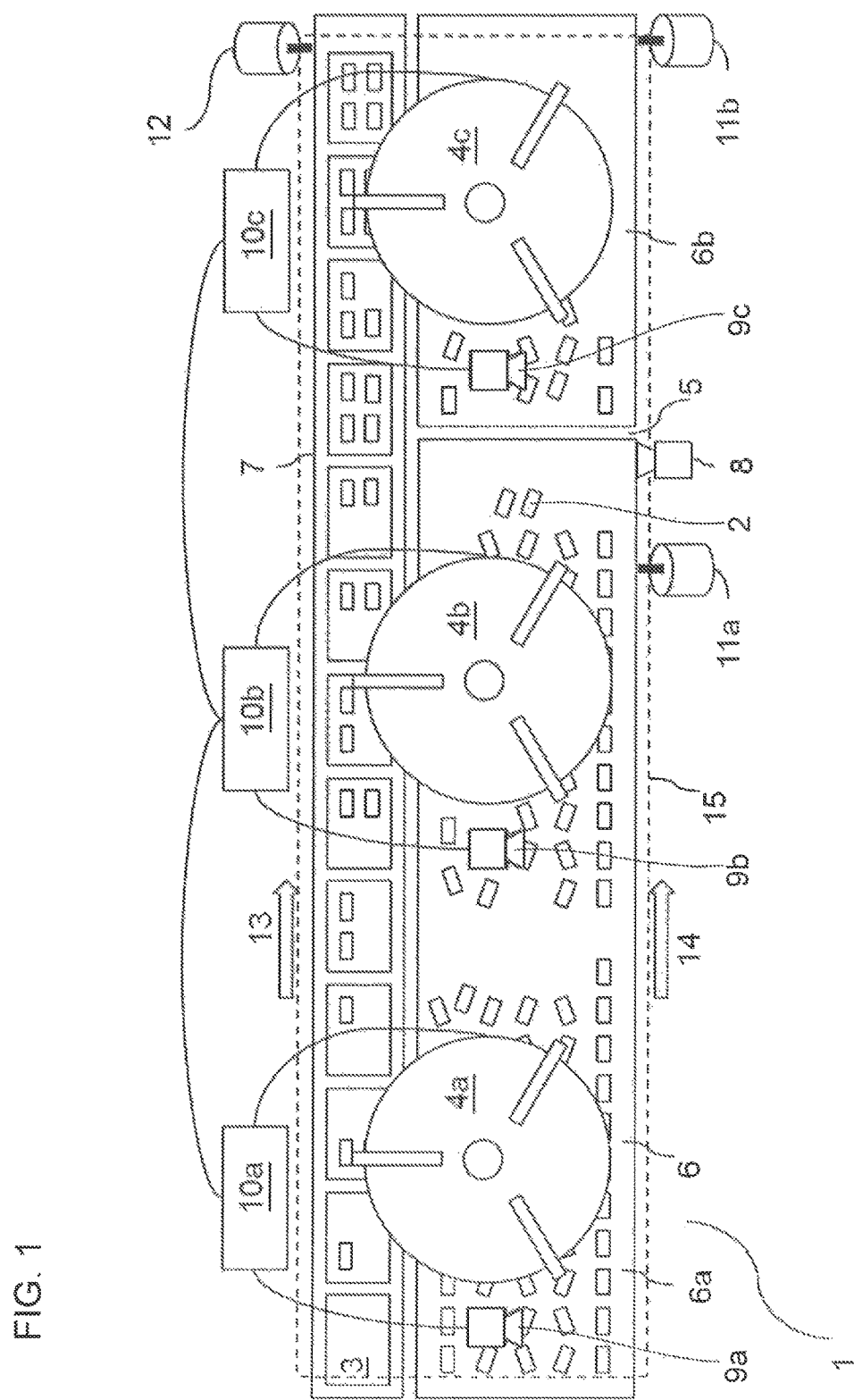

(51) Int. Cl.
*B65B 35/36* (2006.01)
*B65B 35/44* (2006.01)
*B65B 57/12* (2006.01)
*B65B 57/14* (2006.01)
*B65G 47/90* (2006.01)
*B65G 47/26* (2006.01)
*B65G 47/31* (2006.01)

(52) U.S. Cl.
CPC .............. *B65B 57/12* (2013.01); *B65B 57/14* (2013.01); *B65G 47/268* (2013.01); *B65G 47/31* (2013.01); *B65G 47/905* (2013.01)

(58) Field of Classification Search
CPC ......... B65B 57/14; B65B 57/16; B65B 57/20; B65B 35/24; B65B 35/06; B65B 35/36; B65B 35/44; B65G 47/90; B65G 47/905; B65G 47/31; B65G 47/26; B65G 17/06; B65G 47/296; B32B 5/105
USPC ....... 53/237, 238, 240, 50, 57, 58, 494–497; 414/751.1, 744.8
See application file for complete search history.

(56) References Cited

U.S. PATENT DOCUMENTS

| | | | | |
|---|---|---|---|---|
| 5,040,056 A * | 8/1991 | Sager | .................... | B25J 9/0093 348/88 |
| 5,123,231 A * | 6/1992 | Fallas | .................. | B65B 5/101 53/260 |
| 5,603,199 A * | 2/1997 | Hammacher | ........... | B65B 5/105 53/247 |
| 5,778,640 A * | 7/1998 | Prakken | .................. | B65B 5/061 53/244 |
| 5,891,371 A * | 4/1999 | Lepper | ................... | B65B 25/008 198/340 |
| 6,002,125 A * | 12/1999 | Schubert | ................ | B25J 9/1697 250/223 R |
| 6,122,895 A * | 9/2000 | Schubert | ................... | B65B 5/12 53/240 |
| 6,360,871 B1 * | 3/2002 | Meyer | ................... | B65B 21/245 198/419.1 |
| 6,540,063 B1 * | 4/2003 | Fallas | .................... | B65B 5/105 198/419.3 |
| 6,826,444 B2 * | 11/2004 | Herzog | ................... | B65B 5/105 198/395 |
| 6,853,876 B2 * | 2/2005 | Wehrung | ........... | G05B 19/4182 198/571 |
| 6,901,726 B2 * | 6/2005 | Huppi | ..................... | B65B 35/04 53/244 |
| 7,063,206 B2 * | 6/2006 | Haan | .................... | B65G 47/261 198/460.3 |
| 7,168,552 B2 * | 1/2007 | Katayama | .............. | B65G 43/10 198/418.7 |
| 8,015,778 B2 * | 9/2011 | Tischhauser | ............ | B65B 5/105 414/270 |
| 8,015,788 B2 * | 9/2011 | Stephenson | ............. | F01D 5/046 415/114 |
| 8,682,484 B2 * | 3/2014 | Bellante | ............. | G05B 19/4182 53/474 |
| 8,899,001 B2 * | 12/2014 | Bachelle | ................ | B65B 11/10 53/171 |
| 2002/0106273 A1 * | 8/2002 | Huang | ................... | B65G 47/90 414/788.1 |
| 2003/0182898 A1 * | 10/2003 | Huppi | .................... | B65B 35/04 53/251 |
| 2004/0079053 A1 * | 4/2004 | Rohr | ....................... | B65B 5/105 53/473 |
| 2008/0223001 A1 * | 9/2008 | Monti | .................... | B65B 5/105 53/246 |
| 2009/0223878 A1 * | 9/2009 | Grundtvig | .............. | B65B 5/105 209/617 |
| 2010/0242415 A1 * | 9/2010 | Ehrat | ..................... | B65B 35/36 53/474 |
| 2014/0123606 A1 | 5/2014 | Ehrat | | |

FOREIGN PATENT DOCUMENTS

| | | |
|---|---|---|
| DE | 102008055471 | 10/2009 |
| EP | 0856465 | 8/1998 |
| EP | 1285851 | 2/2003 |
| EP | 1352831 | 10/2003 |
| EP | 2184233 | 5/2010 |
| EP | 2233400 A1 | 9/2010 |
| EP | 2236424 | 10/2010 |
| EP | 2520497 A1 | 11/2012 |
| WO | 2008003350 A1 | 1/2008 |
| WO | 2009/138088 | 11/2009 |

* cited by examiner

METHOD AND APPARATUS FOR PLACING PRODUCTS INTO CONTAINERS IN A ROBOT LINE

TECHNICAL FIELD

The invention relates to a method and an apparatus for placing products into containers in a robot line according to the preambles of the independent claims.

PRIOR ART

A robot line is understood to be a facility having more than one robot, which share the tasks of grasping products from a product belt and depositing them into containers on a container transport system.

The robots are generally installed in a fixed manner and the products and containers are passed by the robots, which is why merely this configuration is discussed hereinafter, although the invention is not limited thereto since, in principle, the products and/or the containers could also be stationary and, by contrast, the placing robots could be moved.

A container may also be a chain pitch or otherwise an element determining the position of one or more products. A container transport system may accordingly be a conveyor belt with containers, or a thermoforming machine or a conveyor chain. The transport process can be implemented in a single-track or multi-track manner.

In terms of a central control unit or the individual control units of each robot of such a robot line, it makes no difference whether containers or cavities or Cartesian defined deposit positions are concerned.

In practice, the containers to be filled are usually delivered to a first transport apparatus, where they are accumulated. The containers are then transferred from the first transport apparatus to a second transport apparatus, effectively the actual container belt, on which they are filled with the products, and, once completely full, are then transferred to a third transport apparatus for removal of the filled containers. When filling containers connected fixedly to the container belt, in particular cavities of a thermoforming machine or infeed chains of bag forming, filling, and sealing machines, the containers are, by contrast, conveyed, filled and removed on a single transport apparatus.

The first objective of such an arrangement is to fill the containers completely and, at the same time, to clear all products as far as possible.

A generic method, which achieves these objectives, is known from EP 0'856'465 B1. In that case, products and containers are guided in counterflow along a robot line with parallel transport devices for products and containers. With transport devices that cross one another once or more, the direction of transport of the product belt and of the container belt are likewise selected such that the principle of the counterflow mode of action is maintained. In this case, the relative speed of the products delivered in an irregular manner to the delivered containers, but also the delivery of the next container to be filled, is controlled by the control unit of the robot that is last in the direction of conveyance of the containers or, in the event of failure of said robot, by the control unit of the penultimate robot, such that only completely filled containers leave the working area of this last robot. Both the picking up of the products and the depositing of the products take place, as presented in DE 42 08 818 C2, by synchronization of the robot to the moved product belt or container belt.

With fluctuations in production, the aforementioned embodiment tends toward oscillating effects over the entire robot line. In this case, some robots work alternately at their output limits whilst others are practically at a standstill, and then in turn come to a standstill whilst the others work at the output limit. The oscillating effects reduce the performance of the facility far below the theoretical sum of the capacity of the individual robots and also far below the capacity of a robot line working in a stable manner.

A corresponding improved embodiment is presented in EP 2 236 424 A1, in which the products and containers are conveyed in counterflow, there is an implied balance of load between the robots, and the tendency of the system to oscillate is reduced.

The aforementioned embodiments in counterflow or counterflow mode of action have the disadvantage that the production flow is also in the opposite direction. This is a severe disadvantage, in particular in facilities with high hygienic requirements. Even in other facilities, a 'normal' production flow is generally desired again after the robot line, wherein the container transport system turns the containers into the direction of product travel via a curve and passes by the robot line. This leads minimally, however, to additional transport systems. In addition, such a modification to the direction of travel can only be implemented with difficulty from a technical point of view in certain transport systems, such as flow wrapper chains.

A robot line in co-current flow would accordingly present an advantageous embodiment. The disadvantage of the co-current flow embodiment lies in the fact that, at the end of the robot line, a few gaps in the containers have to be filled with few products still available. A corresponding embodiment is presented in DE 195 22 368 C2. By counting the products at the inlet and by coordinated supply of containers, complete filling of the containers with minimal overflow can be ensured.

In that case, the containers are moved at the same speed where possible and in parallel beside the products determined for a container. This hinders the use of containers that only accommodate a small number of products before becoming full, since in this case a plurality of container belts has to be used. By contrast, with containers that accommodate a large number of products before becoming full, the distance between the containers on the container belt has to be selected to be unnecessarily large. This embodiment also tends strongly toward oscillation.

EP 1 285 851 B1 presents a robot line, in which, due to the available products and due to the free container positions, the placing robots are actuated such that the placing robots are utilized as uniformly as possible. In this case, the capacity of the placing robots and the speed of the container belt is determined continuously on the basis of auxiliary conditions that are to be observed. The calculation of the corresponding time-discrete systems of equations and optimization thereof has proven in practice to be extremely processor intensive and accordingly requires efficient control computers.

All of the aforementioned embodiments in co-current flow adapt the container density to the product flow in such a way that as many deposit positions as products are available. Under consideration of production fluctuations, this can practically only be achieved with container and product transport systems travelling at equal speed. The container density is set via the distance between the containers in this case. This in turn means that the containers have to form individual units and not, for example, chains of a flow wrapper or of a sideloader (cartoners).

Another approach for optimizing the efficacy of robot lines is presented in EP 1 352 831 B1. The product flow and container flow can be decoupled by means of buffer areas. The filling capacity of the buffer area is used for the supply of containers.

An additional sorting criterion can be an effective further, previously undisclosed criterion for generic facilities. A typical example is the consideration of the mass of products for forming packages of equal weight. To utilize the statistical distribution to the optimum, an objective is to provide the robot line with the greatest possible number of cavities and products for processing. The higher the number of available positions at a specific moment in time, the higher is the likelihood of statistically expedient combinatorics. This objective is undermined by the reduction in container density for implementation of co-current flow, in particular in the partial load area of the facility.

The object according to the present invention is therefore to create a method and a respective apparatus, with which it can be ensured, either in co-current flow or in the co-current flow principle, that is to say whilst maintaining the production flow, that the greatest possible density of products and containers is provided and that the containers can be filled completely, without impairing the efficiency of the facility.

DISCLOSURE OF THE INVENTION

An apparatus according to the invention for placing at least one sort of conveyed products into containers accommodating a specific number of products has at least two placing robots defining a transfer area. In addition, the apparatus comprises at least one transport device for transporting the products, and at least one transport device for transporting the containers. The transport device for the products has at least one separation point in the direction of travel within the transfer area, said separation point dividing the transport device for the products into at least two transport portions that can be actuated independently of one another. These transport portions are arranged one after the other.

At this juncture and hereinafter, a container is understood to mean a device that has a specific number of deposit positions for accommodating products. For example, a container can be a physical container or a virtual container on a transport belt, a conveyor chain or on a plastic strip for flow wrappers. A deposit position is understood to mean both a discretely defined position for depositing the products and a mere available space in the container.

A transfer area of the apparatus is understood, at this juncture and hereinafter, to mean the area in which the products to be transferred are picked up by the placing robots and transferred into the corresponding containers to be filled. In contrast, the working area of a placing robot is understood to mean the area that is covered by the gripper of an individual placing robot. The working areas of the individual placing robots may intersect. The placing robots may also be arranged, however, such that the working areas do not intersect. The transfer area of the apparatus comprises all working areas of all placing robots, including any gaps provided between the individual working areas, and starts with the working area of the first placing robot and ends with the working area of the last placing robot.

A transport device is understood to mean a conveying means that is suitable for guiding products or containers through the transfer area. In practice, products are often transported on belts or grids. However, other systems are also known, such as chain conveyors, vibratory feeders, baking tray conveyors, or the chain of a flow wrapper or of a thermoforming machine as a corresponding transport device. The products and containers can be arranged on the transport device in a given, regular pattern, or else can be distributed over the transport device in a free, random manner. They can also be conveyed on the transport device one after the other in a row, or side-by-side. The transport device for transporting the products and/or the containers can have one track or a plurality of tracks.

A sort of product is understood to mean that the products have common features and are equivalent in terms of the transfer. Products within the same sort may have further features that are relevant to the transfer process. For example, the weight or color of products of a sort may be different and may be used as a criterion for the transfer process.

Due to the separation of the transport device at the separation point and due to the independent actuation of the transport portions, the gap produced if the transport device is cleared by a placing robot is thus not transferred to the subsequent placing robot. By decoupling the speed of the transport portions, gap-free transport of products can be ensured on the transport portion following a separation point, since the transport portion is accordingly slowed or stopped until products can again be passed on at the transport portion arranged before the separation point.

In order to transport products from the first transport portion to the following transport portion at the separation point, both transport portions must be moved forward. The speeds of the two transport portions are preferably coupled such that the products are transported similarly to the manner in which they are transported on a transport system that does not have a separation point.

The compulsory coupling, known from the prior art, of the transport systems in apparatuses operating by the 'co-current principle' can be broken, and each placing robot can be provided with products at any time.

Each separation point can be assigned a sensor for checking the presence of products before the separation point. The sensor can be a physical sensor, for example a light barrier or an image processing system, or can be reproduced virtually on the control unit, for example by a camera having corresponding product identification with consideration of the products already removed. Presence is understood to mean the fact that at least one product is located on the transport device, directly before the separation point. The sensor checks the presence of products over the entire width of the transport device, transverse to the direction of travel of the products. For example, checking the presence of products makes it possible to identify gaps, so that the subsequent transport portion can be slowed or stopped. Vice versa, the identification of the presence of products allows the speeds of the transport portions to be coupled in good time so as to ensure continuous further transport of the products via the separation point.

The apparatus may have control means that are designed in such a way that the transport portions are actuated according to a signal of the sensor. As mentioned above, if there is a lack of products, the sensor may for example emit a signal that prompts the control means to stop or slow the transport portion following on from the separation point.

The apparatus may have control means that are designed in such a way that the placing robots grasp the products in areas of low product density. For example, this control means may be integrated in the control units of the placing robots or may be a central master control unit. Product density is understood hereinafter to mean the number of products in a relevant reference area. For example, the transport system may be divided in the direction of travel into virtual segments, in which the number of products and, from this, the product density are determined. If the placing robots grasp in areas or virtual segments of low product density, complete virtual segments can be cleared. Gaps are thus formed intentionally and can be closed at the next separation point. At the same time, other virtual segments can be transferred as completely as possible to subsequent placing robots, that is to say with maximum density of products.

Occupation of the transport device or of the transport portion with maximal product density facilitates tasks in which additional, statistical target variables have to be taken into consideration. Over the high density of products, the chance that a product, which is optimal in terms of additional features, will be presented to the placing robot can be statistically maximized. For example, when loading packages of equal weight, the product having the ideal supplementary weight can be grasped from a maximum number of products.

The apparatus may have a plurality of transport devices for transporting the containers, said transporting devices being arranged approximately perpendicular to the transport device for the products. The number of possible deposit positions in the working area of the placing robot can thus be optimized. The completely filled containers can be collected on a common discharge belt. Approximately perpendicular is understood, in this case, to mean that the transport devices for transporting the containers are arranged at an angle of 45° to 135° to the transport device for the products.

A method according to the invention for inserting at least one sort of conveyed products into containers accommodating a specific number of products by means of an apparatus, in particular as described above, comprises the following steps:
transporting the products on a transport device to a transfer area of placing robots,
grasping of the products in the transfer area by the placing robots,
placing the products into containers,
checking the presence of products on the transport apparatus for the products, before a separation point of the transport apparatus,
controlling a transport portion following on from the separation point according to the result of the previous check.

In this case, the apparatus has at least two placing robots defining a transfer area, at least one transport device with at least two transport portions in the direction of travel for transporting the products, said transport portions being separated from one another within the transfer area by a separation point, and at least one transport device for transporting the containers.

If there are no products before a separation point, the subsequent transport portion can be slowed or stopped. If the transport apparatus is cleared by a placing robot and the subsequent transport portion is controlled accordingly, a gap that is present can thus be eliminated and is not transferred to the subsequent placing robot. The transport portion following on from the separation point can be operated in a modified manner, in particular slowed or stopped, until products are again identified, and can be passed on, at the transport portion arranged before the separation point. The placing robots of the subsequent transport portion are prevented from coming across an empty transport portion and failing to work.

A first separation point between two transport portions can theoretically be located directly at the input of the apparatus, that is to say before the first placing robot and therefore before the transfer area. In this case, it may be expedient to stop not only the subsequent transport portions, but also the entire apparatus. If all placing robots and the transport systems are stopped, the state of the apparatus is maintained fully until the gap is closed, and start-up once the gap has been closed is simplified, since there is already a distribution of products provided in the apparatus.

The placing robots can grasp the products in areas or virtual segments of low density. Areas with complete gaps and areas with the greatest possible density can thus be produced. The areas with complete gaps can be discarded at the next separation point.

The transport devices for the products and for the containers can be conveyed in co-current flow or in the co-current flow mode of action, and the last placing robot or, in the event of failure thereof, the second-to-last placing robot of the apparatus can control the speed of the transport device for transporting the containers in such a way that only full containers leave the apparatus. Co-current flow is understood to mean that the direction of travel of the transport devices for the products and for the containers is oriented in the same direction. Control of the transport device for the containers makes it possible to stop the transport of the containers before a container that is not yet completely full leaves the working area of the last placing robot or, in the event of failure thereof, of the second-to-last placing robot. The transport device is preferably controlled in such a way that a speed can be set that is as constant as possible, at which all containers are completely filled and, at the same time, free deposit positions are always also present at the last placing robot and, in the event of failure thereof, the second-to-last placing robot.

A target fill level of all deposit positions in the working area or of the deposit positions of each container can be determined increasingly for each working area of the placing robots in the direction of travel of the containers. In addition, each placing robot can be controlled in such a way that the placing robot only transfers products until the target fill level of its working area is reached. On the one hand, a uniform workload over all placing robots of the apparatus can thus be set. Oscillations in the system can be effectively damped and even avoided. The target fill level can be re-established at any moment, even during operation of the facility, from a central control unit on the basis of further data, such as information concerning failed placing robots. It is also possible, in particular in facilities having a container belt that cannot be controlled by the apparatus, to determine the robot performance as a function of the speeds of the portions of the transport apparatus for the products or on the basis of the number of products at the inlet of the facility.

A further method according to the invention for inserting at least one sort of conveyed products into containers, wherein the containers have a specific number of deposit positions for accommodating products, by means of an apparatus in particular as described above comprises the following steps:
transporting the products on a transport device to a transfer area of placing robots,
grasping of the products in the transfer area by the placing robots,
placing the products into containers.

In this case, the apparatus has at least two placing robots defining a transfer area, at least one transport device for transporting the products, and at least one transport device for transporting the containers. The placing robots deposit the products in areas of low density of free deposit positions.

This method simplifies the embodiment for apparatuses of which the transport apparatus for containers may also convey empty containers from the apparatus. One application is a supply to a flow wrapper. The flow wrapper may ignore completely empty containers, which is known as empty pitch compensation, and may process completely filled containers. In the case of partially filled containers, the contents have to be blown out and are lost. By depositing in areas of low density of free deposit positions, it is possible for completely filled or completely empty containers to leave the apparatus by way of majority. The loss by blow-out is prevented or reduced. The empty pitches can be interpreted as gaps in the container transport. Since these can be compensated by the subsequent machine, they do not have to be closed by the apparatus. Accordingly, it is possible to dispense with the separation of the transport device for products. To this end, the logic of grasping and depositing of the placing robots is inverted. Instead of grasping products in areas of minimal product density, products are preferably deposited in areas of low density of free deposit positions. The same logic thus makes it possible to obtain the greatest possible, cohesive areas of completely filled containers. This means that there are minimal, compact gaps in the container flow. This is advantageous for the operation of a subsequent machine with empty division compensation.

DESCRIPTION OF THE INVENTION

Figure 2:
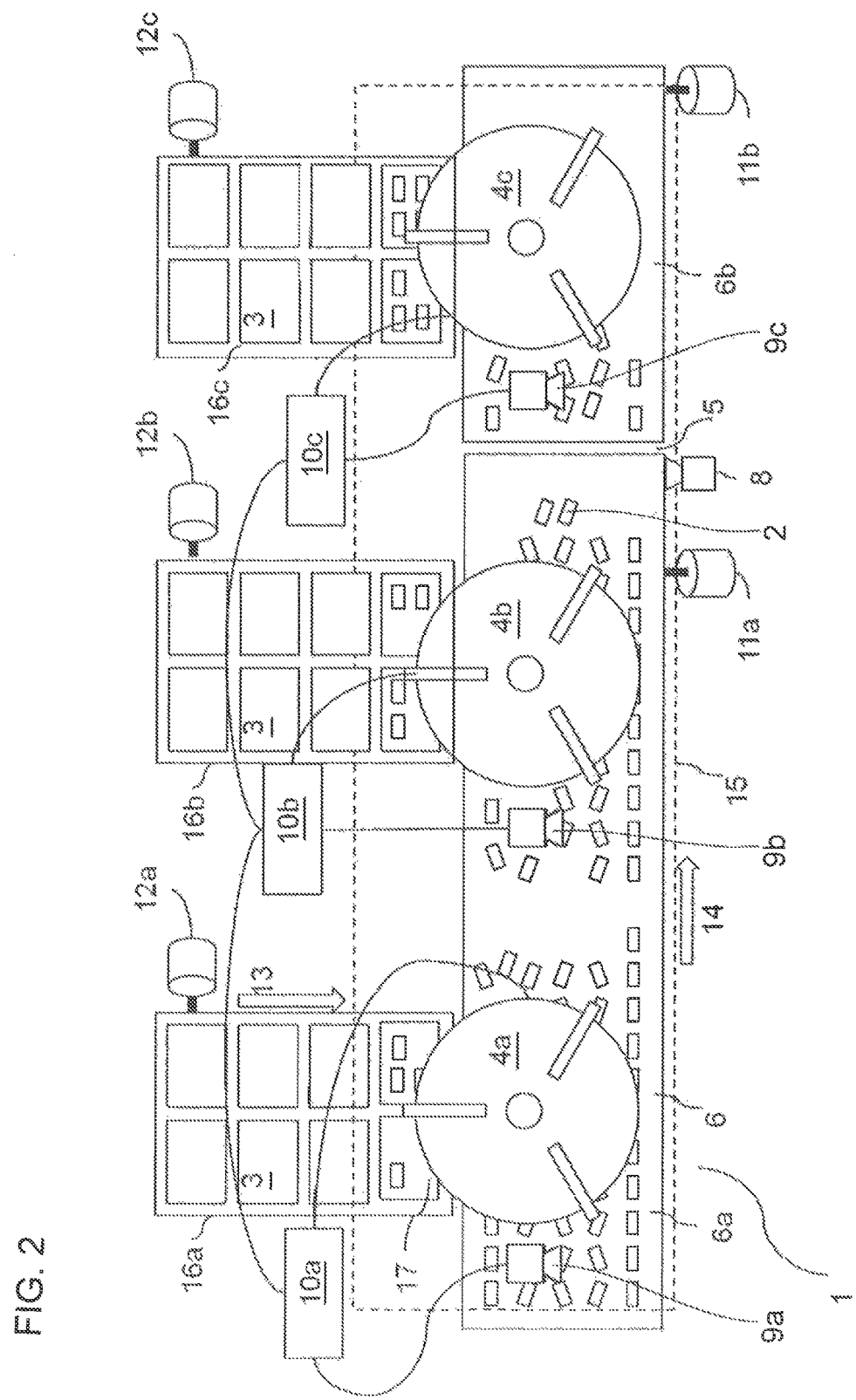

Further individual features and advantages of the invention will emerge from the following description of the exemplary embodiments and the drawings, in which:

FIG. 1: shows a first embodiment of an apparatus 1 according to the invention,

FIG. 2: shows a further embodiment of an apparatus 1 according to the invention.

With reference to FIG. 1, a plan view of an apparatus 1 according to the invention in the form of a robot line is illustrated, in which products 2, which are arranged randomly on a transport device 6 comprising two transport portions 6a, 6b, pass beneath the placing robots 4a, 4b, 4c in the direction of travel 13, 14, that is to say from left to right. A transport device 7, on which empty and partially filled containers 3 are transported, runs parallel to the transport device 6 for the products 2. The working areas of all placing robots 4a, 4b, 4c define the transfer area 15.

The control units 10a, 10b, 10c can identify the position and orientation of the products 2 relative to the transport device 6 by means of sensors 9a, 9b, 9c. The current position of the products 2 relative to the placing robots 4a, 4b, 4c can be established at any time by means of the position encoders 11a, 11b. Similarly, the current position of the containers 3 on the transport device 7 can be established via the position encoder 12. The placing robots 4a, 4b, 4c can be actuated accordingly to grasp products 2 and to deposit them into the containers 3.

The two transport portions 6a, 6b of the product transport device 6 are separated by a separation point 5. A sensor 8 is installed before the separation point 5. As soon as products 2 on the first transport portion 6a of the product transport device 6 reach the separation point 5, the second transport portion 6b of the product transport device 6 is moved forward by the control unit 10c at the same speed as the first transport portion 6a so that the products 2 move along in a manner similar to that with continuous product transport. The speed is gauged on the basis of the temporal modification of the position encoders 11a, 11b. The control unit 10c is a decentralized control unit of the placing robot 4c. It goes without saying that the control unit of the placing robots 4a, 4b, 4c and/or of the transport portions 6a, 6b can be controlled from a central control unit.

If the sensor 8 detects a gap in the product carpet on the transport portion 6a before the separation point 5, the second transport portion 6b is stopped by the control unit 10c.

In order to create gaps to be closed, even with transport devices 6 that transport a plurality of products 2 side by side, the placing robots 4a, 4b, 4c are actuated in such a way that they grasp products in areas of low product density.

In order to only allow completely filled containers 3 to leave the transfer area 15, the transport device 7 for the containers 3 may be controlled in such a way that no incompletely filled containers 3 leave the working area of the last placing robot 4c or, in the event of failure thereof, of the second-to-last placing robot 4b.

FIG. 2 shows a further embodiment of an apparatus 1 according to the invention. Alternatively to an individual transport device for the containers, as shown in FIG. 1, a plurality of transport devices 16a, 16b, 16c for containers 3 is provided with the direction of travel 13 approximately perpendicular to the transport device 6 for products 2 or to the direction of travel 14 of the products 2. The working areas of all placing robots 4a, 4b, 4c define the transfer area 15.

The control units 10a, 10b, 10c can identify the position and orientation of the products 2 relative to the transport device 6 by means of sensors 9a, 9b, 9c. The current position of the products 2 relative to the placing robots 4a, 4b, 4c can be established at any time by means of the position encoders 11a, 11b. Similarly, the current position of the containers 3 on the transport devices 16a, 16b, 16c can be established via the position encoders 12a, 12b, 12c. The placing robots 4a, 4b, 4c can be actuated accordingly to grasp products 2 and to deposit them into the deposit positions 17 of the containers 3.

The operating principle of the placing robots 4a, 4b, 4c, of the transport portions 6a, 6b, of the separation point 5 and of the sensor 8 is identical to that in the exemplary embodiment according to FIG. 1.

The invention claimed is:

1. An apparatus for inserting at least one sort of conveyed products into a container accommodating a specific number of products, the apparatus having at least first and subsequent second placing robots defining a transfer area, at least one transport device for transporting the products, and at least one transport device for transporting the containers, wherein the transport devices for transporting the products and for transporting the containers are operated so that the products are conveyed in co-current flow or in a co-current flow mode of action relative to a flow of the containers, the transport device for transporting the products has at least one separation point in a direction of travel within the transfer area between the first and the second placing robots, and said separation point dividing the transport device for transporting the products into at least first and second transport portions, wherein the first placing robot is located so as to only select products from the first transport portion while the second placing robot only selects products from the second transport portion, said at least first and second transport portions can be actuated independently of one another such that any empty space or gap, produced by the first placing robot on the first transport portion, during operation, can be eliminated and not transferred to the second transport portion and the second placing robot.

2. The apparatus as claimed in claim 1, wherein each separation point is assigned a sensor for checking a presence of products before the separation point.

3. The apparatus as claimed in claim 2, wherein the apparatus has control means that are designed in such a way that the first and the second transport portions are actuated according to a signal of the sensor.

4. The apparatus as claimed in claim 1, wherein the apparatus has control means that are designed in such a way that the first and the second placing robots grasp the products in areas of low product density compared to areas of higher density within a respective working area.

5. A method for inserting at least one sort of conveyed products into containers accommodating a specific number of products by means of an apparatus, comprising at least a first and a second placing robots defining a transfer area, at least one transport device with at least a first and a second transport portions in the direction of travel for transporting the products, said transport portions being separated from one another by a separation point within the transfer area between the first and the second placing robots, the products being transported to the transfer area on the transport device for the products and being grasped in the transfer area by the placing robots and placed into the containers, wherein the presence of products before a separation point is checked and the subsequent transport portion is controlled accordingly; wherein the first placing robot is located so as to only select products from the first transport portion while the second placing robot only selects products from the second transport portion.

6. The method as claimed in claim 5, wherein if there are no products before a separation point, the subsequent transport portion is slowed or stopped.

7. The method as claimed in claim 5, wherein the placing robots grasp the products in areas of low product density.

8. The method as claimed in claim 5, wherein the products and the containers are conveyed in co-current flow or in the co-current flow mode of action, and the last placing robot or, in the event of failure thereof, the second-to-last placing robot of the apparatus controls the speed of the transport device for the containers in such a way that only full containers leave the apparatus.

9. The method as claimed in claim 5, wherein a target fill level is determined increasingly for each working area of the placing robots in the direction of travel of the containers, and wherein each placing robot is controlled in such a way that it only transfers products until the target fill level for its working area is reached.

* * * * *